United States Patent Office 3,252,652
Patented May 24, 1966

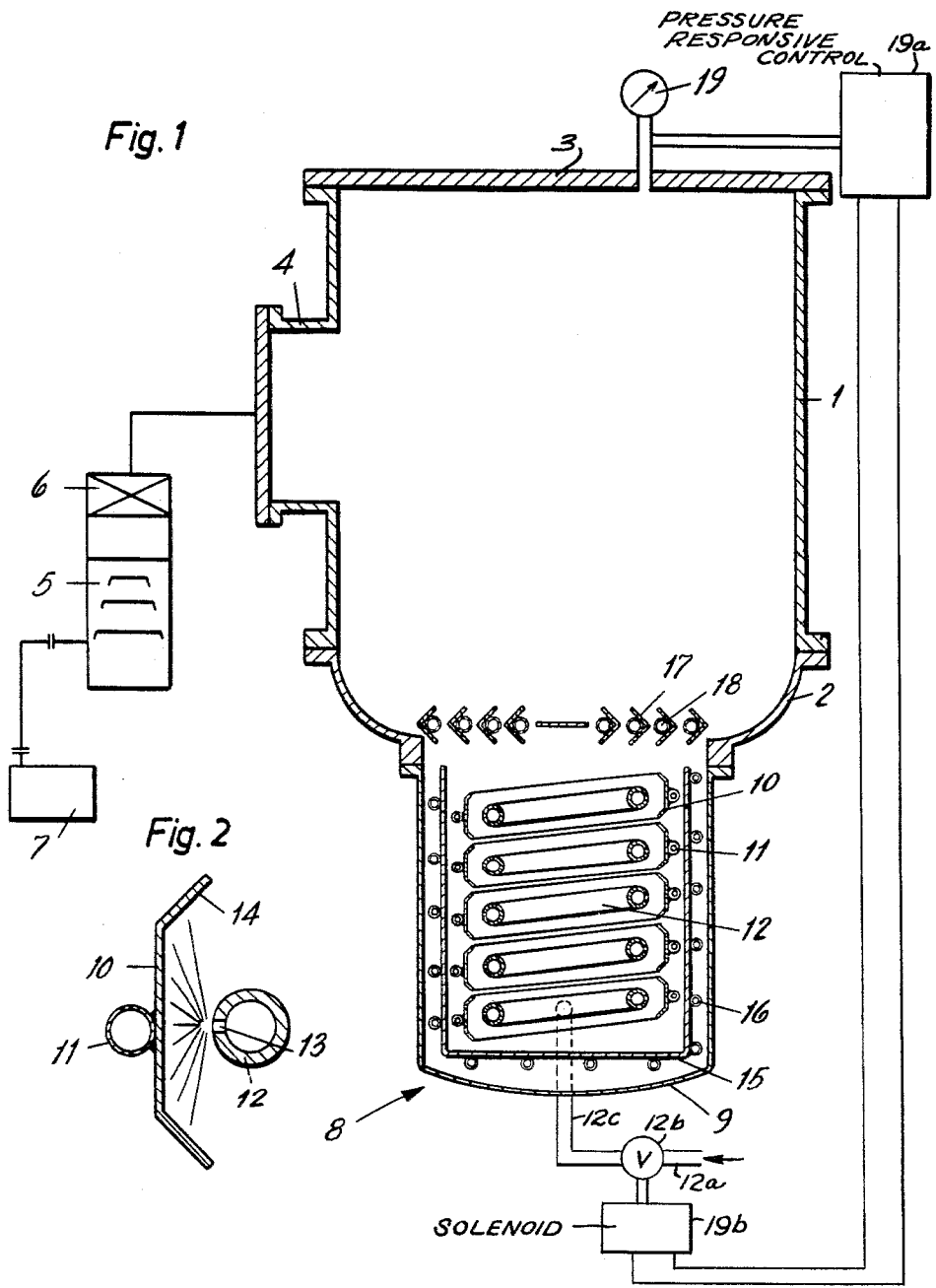

3,252,652
PROCESS AND APPARATUS FOR THE PRODUCTION OF HIGH VACUUMS
Ernst A. Trendelenburg, Vaduz, and Jürgen P. Hengevoss, Balzers, Liechtenstein, assignors to Bendix Balzers Vacuum, Inc., Rochester, N.Y., a corporation of Delaware
Filed Jan. 17, 1964, Ser. No. 338,373
Claims priority, application Austria, Jan. 24, 1963, A 541/63
12 Claims. (Cl. 230—69)

The present invention concerns a process and an apparatus for the production of a high vacuum through the attachment of the gas molecules on a deep cooled surface. This type of pump, will be designated in the following as cryopump for short, the deep cooled surface which condenses the gases to be pumped will be called the cryosurface.

At the temperature of 4.2° K., the boiling point of liquid helium at atmospheric pressure, or at still lower temperatures almost all gases have vapor pressures below about $10^{-15}$ torr. Only the vapor pressure of helium and of hydrogen are still of measurable magnitude. In a vacuum apparatus the helium that comes out of the atmospheric air in general is not troublesome as its partial pressure after the evacuation is usually negligibly small. The state of affairs with hydrogen is different. Since it is well known that hydrogen constitutes an important part of the residual atmosphere in vacuum apparatus below $10^{-6}$ torr, and its saturation vapor pressure at 4.2° K. lies in the order of magnitude of $10^{-6}$ torr it would appear that ultra-high vacuum is not theoretically attainable with cryosurfaces which are cooled with boiling helium. A cryosurface can of course only condense those gases whose partial pressures are greater than their saturation vapor pressures at the condensation temperature.

This permits one only three different methods to attain useable pumping action for hydrogen below $10^{-7}$ torr with liquid helium cooled surfaces.

(1) One may use the absorption action (in contrast to condensation) on a deep cooled surface area. For this purpose the adhering foreign layers must be removed from these surface areas by baking out beforehand. Immediately after cooling the impinging hydrogen molecules will be absorbed. Condensation begins after the surface area has been covered with a layer of adsorbed hydrogen molecules. Since in general the binding energy of adsorption is greater than that for condensation the average pressure for adsorption is less than that for condensation. A surface area cooled with helium boiling under atmospheric pressure (4.2° K.) can therefore exert a pumping action of hydrogen below $10^{-7}$ torr. The time of duration of this pumping action is nevertheless very limited.

(2) Lower temperatures than 4.2° K. can be obtained through evaporation from a helium bath at reduced pressure by means of pumping. Hydrogen still has a troublesome vapor pressure even at the lowest economically applicable temperatures. At 3.7° K. ($\pm 0.1°$ K.) the vapor pressure is about $5.6 \times 10^{-8}$ torr, and at 2.5° K. ($\pm 0.1°$ K.) it is of the order of magnitude of $10^{-9}$ torr according to known measurements, where the achieved section velocity corresponds to a striking coefficient on the cryosurface for the impinging hydrogen molecules of about 1.

(3) One can utilize the so-called, "Cryotrapping" effect. It is well known that liquid nitrogen cooled surface areas (77° K.) in the presence of water vapor exerts a pumping action for gases which are not condensable at these temperatures. Obviously the hydrogen is trapped in with the molecules of the condensed ice. Other authors have found that hydrogen in the presence of nitrogen will be pumped by a surface area kept at 20° K. In these experiments the hydrogen was mixed as an impurity in nitrogen of 10 p.p.m.

It is an object of the proposed invention to substantially improve the process of "Cryotrapping" for the pumping of hydrogen.

A further object of the invention is to be able to work with higher temperatures of the pumping surfaces for the pumping of any gas by means of cryopumping or to greatly improve the efficiency and the economy of the operation of the cooling equipment in those cases in which sufficiently cold cryosurfaces can be supplied.

The cryotrapping, as is well known, has the real disadvantage that the required pressure in the receiver of the auxiliary gas lies in the same order of magnitude as the pressure of the residual gases to be pumped. One can, to be sure, greatly reduce the partial pressure of a troublesome residual gas by this method, but must take into account the pressure of the auxiliary gas; or one can keep the auxiliary gas pressure low, achieving thereby only an insignificant improvement of the pumping action of the cryosurface on the residual gas. This dilemma is related, in that if the maximum possible improvement of the pumping action of the residual gas is to be realized, every molecule of residual gas to be bound onto the cryosurface must encounter at least one molecule of the condensing auxiliary gas, as has been made probable by further investigation of the invention. A correspondingly higher auxiliary gas pressure appears therefore unavoidable, nevertheless the invention succeeds in holding the deleterious effect of the auxiliary gas on the vacuum in the receiver to a very small amount.

In accordance with the invention the process for the production of very high vacuums in a chamber to be evacuated utilizes a known cryopumping arrangement which is combined with a mechanical pump and/or diffusion pump whereby those molecules of residual gas not removed by the other pumps are removed by the cryopump through impingement on a deep cooled surface of the cryopump where the condensable auxilliary gases are bound and is characterized in that the introduction of the auxiliary gas into the system is provided at such a place and in such a direction that the auxiliary gas molecules have a higher probability of striking the cryosurface than of striking the walls of the enclosing chamber.

This process can be practiced, for example, by the introduction of the auxiliary gases into a part of the system which is separated from the chamber to be evacuated through a flow resistance. According to another variation, which can be combined with the aforementioned, the auxiliary gas is introduced into the system in the form of a beam directed onto the cryosurface, and preferably in the form of a molecular beam.

By the introduction of the auxiliary gas into the system under such geometric conditions that the probability of the auxiliary gas striking on the cold surface is greater than the probability of its striking the walls of the enclosing chamber the greater part of the auxiliary gas will be condensed on the cryosurface before it has an opportunity to be admitted to the chamber and to spoil the vacuum therein.

It has been proved to be espectially important that collision between the molecules of the auxiliary gas and the residual gas to be pumped should be avoided during the bombardment of the cryosurface with a beam of the auxiliary gas. This can be accomplished if the distance between the auxiliary gas source and the cryosurface is chosen smaller than the mean-free-path of the auxiliary gas in the residual atmosphere about the cryosurface. In this way the scattering of the molecules of the auxiliary gas into the space to be evacuated is reduced so that the object of the invention can be still better attained.

An example of the process according to the invention can be applied in a large industrial installation and it will be illustrated in the following text and sketch, how an installation of this kind according to the invention can be built.

FIGURE 1 shows in cross section a vacuum installation consisting of a chamber to be evacuated and combined with a cryopumping arrangement in accordance with the present invention.

FIGURE 2 shows in magnified section of FIGURE 1 the relative arrangement of the cryosurface and the auxiliary gas source.

Numeral 1 designates the chamber to be evacuated, for example a kettle, with a bottom part 2 and cover 3. A pumping system of a conventional type is diagrammatically shown connected to a flange 4, consisting, for example, of a diffusion pump 5 with a valve 6 and a mechanical fore pump 7 which serves to bring the chamber to a suitable initial vacuum of about $10^{-5}$ to $10^{-6}$ torr. The bottom part 2 of the chamber is built with a connecting flange for the cryopump which is housed in the housing 9. This is shown schematically as a spiral formed large surfaced metal band 10 which is fastened to a cooling means with a heat conducting joint, and will, for example, be deep cooled by liquid helium flowing through a cooling tube 11 and becomes the true cryosurface for the pumping out of gases. On the opposite side of this cryosurface a spirally formed tube 12 is located a small distance away and is provided with a great number of bored holes or ports 13 which are directed toward the condensation surface. Auxiliary gas which is easily condensable at the temperature of the cryosurface, is introduced from inlet 12a via valve 12b and conduit 12c under low pressure through the tube 12, so that it discharges from the ports 13 toward and impinges on the oppositely disposed cryosurface. The necessary auxiliary arrangement for providing the auxiliary gases and the adjustment of the auxiliary gas pressure in tube 12 are conventional practice and will not further be described here.

The important parts of the pumping arrangement are shown enlarged in FIGURE 2. The metal band 10 which serves as the cryosurface proves to have such an advantageous shape that even those molecules or atoms of the auxiliary gas which emerge from the ports 13 at the greatest possible angle (nearly tangential to the wall of the tube 12) still strike on the flange portions 14 of the cryosurface.

The described cryopumping arrangement is screened or shielded against the absorption of heat in a well known manner by an external deep cooled wall. The screening is formed through a metal shell 15 (or several such shells) which will be cooled by suitable cooling means, for example, liquid nitrogen flowing through cooling tube 16.

In the described embodiment, an angle or chevron baffle 17 is mounted in chamber 1 adjacent the cryopump so as to obstruct the flow of gases from the cryopump to chamber 1 and prevent the direct radiation of heat from the chamber into the cryopump while permitting the flow of gases from chamber 1 to the cryopump, thereby increasing the probability that impingement of the auxiliary gas molecules on the cryosurface is greater than the probability of said molecules striking the walls of chamber 1.

The auxiliary gas molecules, which in consequence of deficient condensation (by a capture probability 1) or in consequence of collisions with themselves or with molecules of the residual gas become scattered and fly in the direction of the chamber are prevented from directly penetrating into said chamber through the flow baffle or restriction 17, and by being reflected thereby back into the pump housing, the probability of their being condensed on subsequent impact on the cryosurface is preserved. It is also appropriate to improve the restriction to flow of baffle 17 by cooling it by means of tube 18 to a temperature which in the case of impinging auxiliary gas molecules permits their condensation.

The distance between the cryosurface and the auxiliary gas source in the illustrated embodiment is especially small in order to easily fulfill the condition referred to above for the reduction of the scattering of the auxiliary gas molecules for the mean-free-path length of the same in the residual gas atmosphere of the pump housing. This mean-free-path length is known to be inversely related to the pressure of the residual gas atmosphere, i.e. the smaller the pressure the greater the length. If the distance between the cryosurface and the auxiliary gas beam source is given, the initial vacuum required to be supplied by the auxiliary pumps 5 and 7 can be established according to known formulas and conversely, if the initial vacuum is given, the necessary distance can be ascertained.

A further factor, which has a part in the scattering of the auxiliary gases, is the number of collisions of the auxiliary gas molecules among themselves. This is dependent upon the intensity of the auxiliary gas beam, that is to say on the density of the auxiliary gas in the beam. Also this quantity can be easily controlled by appropriate adjustment of the auxiliary gas pressure in tube 12 by means of valve 12b whose position may in turn be regulated by pressure responsive control 19a and solenoid 19b. The necessary pressure is a function of the end or ultimate vacuum required in the chamber.

The optimum adjustment of the pressure in tube 12 is to be empirically determined and may be determined as that pressure at which the pressure in chamber 1, measured with the ultra-high vacuum gauge 19, no longer shows a reduction with further increase in the flow of the auxiliary gas. More auxiliary gas than necessary must not be used. If the pressure of the auxiliary gas in 12 is less than the optimal pressure, the efficiency of the cryosurface is spoiled, but if it is greater, then it will quite quickly become covered with a layer of frozen auxiliary gas, which through its heat insulating effect impedes further attachment of the residual gas molecules and thereby shorten the possible working time without interruption.

It is recommended that the cooling means not be used during the first phase of evacuation, ie., during the fore-evacuation of the chamber and the pump housing through the pumps 5 and 7 and, if possible, the whole system to be evacuated and all connecting parts should be baked out by heating (through a conventional heating apparatus not described here) to a temperature of about 450°, in order, as far as possible, to desorb and pump off the large amounts of gas still adhering on the inner walls and on the connection pieces.

The cryopumping arrangement is first put into operation after this outgassing and further cooling of the chamber, whereupon after closing the valve 6 a rapid reduction of pressure commences. If now, in following the procedure of the present invention, the auxiliary gas regulating valve is opened a little and a small amount of auxiliary gas is permitted to flow through the conductor or tube 12 to be discharged through the openings 13, whereby with the described arrangements and the geometric proportions of the embodiment the pumping cryosurface is more easily reached than the chamber, then a further quite important pressure reduction is unexpectedly obtained.

The present invention has been explained in connection with the example of pumping hydrogen with argon being used as the auxiliary gas to produce an ultra-high vacuum; but the invention has broader significance in that other gases may be pumped and gases other than argon used as the auxiliary gas providing that the appropriate low temperature cryosurface can be obtained. Fundamentally one can use any of the residual gases as the auxiliary gas for the pumping of all materials, whose vapor pressure at the temperature of the cryosurface is not greater than the ultimate vacuum anticipated in the chamber. Thus one could use, if otherwise compatible with the operation, as the auxiliary gases carbon monoxide, water vapor, or also these mixed with air instead of argon for the pumping of hydrogen.

In each case involving the utilization of an auxiliary gas if the necessary auxiliary gas pressure and the temperature of the cryosurface at which the gas is certain to be condensed are provided, even though these requirements for the gas to be pumped are not fulfilled, then with the process according to the invention, as has been shown in the detailed description of the example of hydrogen-argon, one can trap gases that are generally not possible to condense under the pressure and temperature conditions prevailing in the region of the cryosurface. In other cases, as when the pressure and temperature conditions necessary to condense the residual gas exist, but where the pumping efficiency is low and the pumping action slow because of the reduced capture probability of the impinging auxiliary gas molecules, the present invention is useful in improving the efficiency and pumping action without increasing the pumping surface or having to reduce its temperature.

The invention makes it possible, through the choice of the kind of auxiliary gas for the gas to be pumped to attain a condensation coefficient of nearly 1.

In accordance with the process of the invention, the admission of the auxiliary gas to bombard the cryosurface with molecules or atoms themselves may be accomplished intermittently, in which case the intermittent admission or bombardment can be controlled through the pressure in the space to be evacuated.

As pointed out above, only a fixed amount of auxiliary gas is useful for the support of the pumping action of the cryosurface with the optimum amounts varying according to the size of the cryosurface and depending on the residual gas conditions, which can easily be ascertained beforehand through experiment in a particular case. It, therefore, appears desirable to so regulate the intensity of the auxiliary gas beam so that on the average the number of auxiliary gas molecules per unit time impinging on the cryosurface stands in a fixed preselected relation to the number of molecules of the gas to be pumped impinging on the cryosurface. It appears that the maximum pumping performance will then be attainable when the number of molecules of the residual gas to be captured directly approaches the number of condensing molecules of the auxiliary gas.

Obviously the described apparatus for carrying out the process of the invention may be modified in many different ways. The cryosurface obviously does not have to be a separate spiral formed surface as in the described embodiment, but can, for example, also be formed in some way as a part of the receiver walls. In large vacuum chambers, of which most are produced in cylindrical form on the basis of the mechanical stability, the condensation surface may be forfed as a part of the inner surface of the cylindrical shell, which then in actual practice is substantially radial to all directions of beaming auxiliary gas sources disposed along the longitudinal axis of the cylindrical shell.

In most cases the process according to the invention can also be practical with existing vacuum equipment with cryosurface in which an auxiliary gas conductor is brought in at an appropriate place. The necessary auxiliary equipment for the cooling of the cryosurface and the arrangement of the cooling medium are generally known and will therefore not be described here.

We claim:

1. The method of producing a very high vacuum in a chamber which is connected to a cryopumping system wherein an auxiliary gas condensable on the cryosurface of the system is used to trap the residual gas molecules remaining in the chamber after the chamber has been pumped by mechanical and/or diffusion pumps comprising the introduction of the auxiliary gas into the system at a place and in a direction such that there is a greater probability of the auxiliary gas molecules striking the cryosurface rather than the walls enclosing the chamber.

2. The method of claim 1 wherein the auxiliary gas is introduced into the system in the form of a beam directed onto the cryosurface.

3. The method of claim 2 wherein the distance between the beam source of the auxiliary gas and the cryosurface is less than the corresponding mean-free path of the molecules of the auxiliary gas in the residual atmosphere in front of the cryosurface.

4. The method of claim 1 wherein the auxiliary gas is intermittently introduced.

5. The method of claim 1 wherein the amount of auxiliary gas introduced is regulated so that the amount of auxiliary gas to be condensed is in a predetermined ratio to the amount of residual gas to be captured.

6. The method of claim 1 in which hydrogen is the residual gas wherein the cryosurface is cooled with liquid helium and argon is used as the auxiliary gas.

7. The method of claim 1, wherein the material to be used as an auxiliary gas has a vapor pressure at a temperature of zero degrees centigrade significantly higher than the ultimate pressure to be attained in the chamber.

8. Vacuum pumping apparatus having a chamber to be evacuated,
   a cryopump adapted to condense the gas to be pumped connected to said chamber,
   a cryosurface in said cryopump, and
   an auxiliary gas conductor mounted in said cryopump opposite said cryosurface to discharge auxiliary gas directly toward said cryosurface.

9. The vacuum pumping apparatus of claim 8 wherein the auxiliary gas conductor is spaced from the cryosurface a distance equal to the mean-free path length of the auxiliary gas molecules used in the cryopump.

10. Vacuum pumping apparatus having a chamber to be evacuated,
    a cryopump connected to said chamber,
    conductor means for introducing an auxiliary gas into said cryopump, valve means for controlling the flow through said conductor means, and
    means responsive to the pressure in said chamber for controlling said valve means.

11. Vacuum pumping apparatus having a chamber to be evacuated,
    a cryopump connected to said chamber,
    a spiral shaped cryosurface in said cryopump,
    spiral shaped auxiliary gas conductor tube mounted radially inwardly of and opposite to said cryosurface, and
    a plurality of discharge ports formed in said tube, said ports opening in the direction of the cryosurface.

12. The vacuum pumping apparatus of claim 11 in which the ports are spaced such that the areas of the cryosurface struck by the gas discharged from adjacent ports overlap.

References Cited by the Examiner

UNITED STATES PATENTS 3,075,689  1/1963  Stevenson _____ 230—101

MARK NEWMAN, *Primary Examiner.*

WARREN E. COLEMAN, *Assistant Examiner.*